(12) United States Patent
Hood (10) Patent No.: US 7,308,427 B1
(45) Date of Patent: Dec. 11, 2007

(54) AMORTIZATION FOR FINANCIAL PROCESSING IN A RELATIONAL DATABASE MANAGEMENT SYSTEM

(75) Inventor: George Robert Hood, Poway, CA (US)

(73) Assignee: NCR Corp., Dayton, OH (US)

( * ) Notice: Subject to any disclaimer, the term of this patent is extended or adjusted under 35 U.S.C. 154(b) by 1193 days.

(21) Appl. No.: 09/845,924

(22) Filed: Apr. 30, 2001

Related U.S. Application Data

(63) Continuation-in-part of application No. 09/608,355, filed on Jun. 29, 2000, and a continuation-in-part of application No. 09/610,646, filed on Jun. 29, 2000, and a continuation-in-part of application No. 09/608,681, filed on Jun. 29, 2000, and a continuation-in-part of application No. 09/608,675, filed on Jun. 29, 2000, and a continuation-in-part of application No. 09/608,342, filed on Jun. 29, 2000, and a continuation-in-part of application No. 09/608,682, filed on Jun. 29, 2000.

(51) Int. Cl.
*G06Q 40/00* (2006.01)
(52) U.S. Cl. ..................................... 705/35
(58) Field of Classification Search ............ 705/1, 705/30, 35, 38, 8, 36 T
See application file for complete search history.

(56) References Cited

U.S. PATENT DOCUMENTS 5,189,608 A * 2/1993 Lyons et al. ............... 705/30
5,237,498 A * 8/1993 Tenma et al. .............. 705/30

(Continued)

FOREIGN PATENT DOCUMENTS

EP       1208495      * 10/2000

OTHER PUBLICATIONS

Curley, Bob, "Royal Bank unearths profitability solution," Bank Systems & Technology, Apr. 2000, 2 pages.*

(Continued)

*Primary Examiner*—Andrew Joseph Rudy
(74) *Attorney, Agent, or Firm*—Gates & Cooper

(57) ABSTRACT

A financial processing system that accesses account, event and organization attributes from a relational database management database, wherein: (1) the account attributes comprise data about accounts being measured, (2) the event attributes comprise data about account-related transactions, and (3) the organization attributes comprise data about the organization's financial status. Profitability calculations are performed in the computer using the account, event and organization attributes accessed from the relational database management system, as well as one or more profit factors and one or more rules. The profitability calculations comprise the following:

$$\begin{aligned} \text{Profit } (a_i) \;=\; & \text{Net Interest Revenue (NIR) } (a_i) \\ +\; & \text{Other Revenue (OR) } (a_i) \\ -\; & \text{Direct Expense (DE) } (a_i) \\ -\; & \text{Indirect Expense (IE) } (a_i) \\ -\; & \text{Risk Provision (RP) } (a_i) \end{aligned}$$

for an account $a_i$. The profitability calculations include one or more amortization calculations in the computer using the account, event and organization attributes accessed from the database, and the amortization calculations amortize the Other Revenue, Direct Expense, Indirect Expense, or Risk Provision over a plurality of periods within a term for the account $a_i$. In alternative embodiments, the amortization calculations are selected from a group comprising cash basis, straight-line, declining balance and interest methods.

8 Claims, 3 Drawing Sheets

U.S. PATENT DOCUMENTS

| | | | |
|---|---|---|---|
| 5,249,120 A | | 9/1993 | Foley |
| 5,615,109 A | * | 3/1997 | Eder .............................. 705/8 |
| 5,655,085 A | * | 8/1997 | Ryan et al. .................... 705/4 |
| 5,712,987 A | | 1/1998 | Waits et al. |
| 5,721,831 A | | 2/1998 | Waits et al. |
| 5,802,501 A | * | 9/1998 | Graff ........................ 705/36 R |
| 5,819,237 A | | 10/1998 | Garman |
| 5,884,285 A | * | 3/1999 | Atkins ...................... 705/36 R |
| 5,911,135 A | | 6/1999 | Atkins |
| 5,987,436 A | * | 11/1999 | Halbrook .................. 705/36 R |
| 5,991,743 A | | 11/1999 | Irving et al. |
| 6,026,382 A | | 2/2000 | Kalthoff |
| 6,085,175 A | | 7/2000 | Gugel et al. |
| 6,112,190 A | * | 8/2000 | Fletcher et al. ............... 705/38 |
| 6,233,566 B1 | | 5/2001 | Levine et al. |
| 6,240,399 B1 | | 5/2001 | Frank et al. |
| 6,249,770 B1 | * | 6/2001 | Erwin et al. .................. 705/10 |
| 6,253,192 B1 | | 6/2001 | Corlett et al. |
| 6,275,813 B1 | | 8/2001 | Berka |
| 6,292,787 B1 | | 9/2001 | Scott et al. |
| 6,343,272 B1 | * | 1/2002 | Payne et al. ................... 705/4 |
| 6,360,210 B1 | * | 3/2002 | Wallman ..................... 705/36 |
| 6,389,380 B1 | * | 5/2002 | Bankes ........................ 703/17 |
| 6,393,406 B1 | * | 5/2002 | Eder .............................. 705/7 |
| 6,477,510 B1 | * | 11/2002 | Johnson ...................... 705/30 |
| 6,571,219 B1 | * | 5/2003 | Spivey ........................ 705/36 |
| 6,957,191 B1 | * | 10/2005 | Belcsak et al. ............... 705/38 |
| 2002/0026394 A1 | * | 2/2002 | Savage et al. ................ 705/34 |

OTHER PUBLICATIONS

John R. Johnson, Raising Relationships, Bank Marketing, May 1990, pp. 30-36, footnote 1.*

John R. Johnson, Raising Relationships, Bank Marketing, Jun. 1999, pp. 16-24.*

Kassing, Jay, "Profitability: Growing the Bottom Line," CSI, 1999, 43 pages.

"Canadian Bank Mines for Data-based Gold," Action Items, Dec. 2, 1997, 2 pages.

"Bank of Ireland Selects Compaq AlphaServers to Help Improve Profitability Management," Dec. 3, 1998, Compaq, 2 pages.

"Marquis Tops 300 MCIF-CRM Data Mart Clients Worldwide," Apr. 18, 2000, 2 pages.

Curley, Bob, "Royal Bank unearths profitability solution", Bank Systems & Technology, Apr. 2000, 2 pages.

Middleton, Arthur, "How Profitability Analysis is Used in Financial Services Marketing", date unknown, 3 pages.

* cited by examiner

AMORTIZATION FOR FINANCIAL PROCESSING IN A RELATIONAL DATABASE MANAGEMENT SYSTEM

CROSS REFERENCE TO RELATED APPLICATIONS

This application is related to the following co-pending and commonly assigned patent applications:

Utility application Ser. No. 09/845,461, entitled "TAX ADJUSTMENT FOR FINANCIAL PROCESSING IN A RELATIONAL DATABASE MANAGEMENT SYSTEM," filed on Apr. 30, 2001, by George Robert Hood; and Utility application Ser. No. 09/845,851, entitled "SHAREHOLDER VALUE ADD FOR FINANCIAL PROCESSING IN A RELATIONAL DATABASE MANAGEMENT SYSTEM," filed on Apr. 30, 2001, by George Robert Hood;

both of which applications are incorporated by reference herein.

This application is a continuation-in-part of the following co-pending and commonly assigned patent applications:

Utility application Ser. No. 09/608,355, entitled "ADVANCED AND BREAKTHROUGH NET INTEREST REVENUE IMPLEMENTATION FOR FINANCIAL PROCESSING IN A RELATIONAL DATABASE MANAGEMENT SYSTEM," filed on Jun. 29, 2000, by George Robert Hood and Paul H. Phibbs, Jr.;

Utility application Ser. No. 09/610,646, entitled "BASIC AND INTERMEDIATE NET INTEREST REVENUE IMPLEMENTATION FOR FINANCIAL PROCESSING IN A RELATIONAL DATABASE MANAGEMENT SYSTEM," filed on Jun. 29, 2000, by George Robert Hood and Paul H. Phibbs, Jr.;

Utility application Ser. No. 09/608,681, entitled "OTHER REVENUE IMPLEMENTATION FOR FINANCIAL PROCESSING IN A RELATIONAL DATABASE MANAGEMENT SYSTEM," filed on Jun. 29, 2000, by George Robert Hood;

Utility application Ser. No. 09/608,675, entitled "DIRECT EXPENSE IMPLEMENTATION FOR FINANCIAL PROCESSING IN A RELATIONAL DATABASE MANAGEMENT SYSTEM," filed on Jun. 29, 2000, by George Robert Hood;

Utility application Ser. No. 09/608,342, entitled "INDIRECT EXPENSE IMPLEMENTATION FOR FINANCIAL PROCESSING IN A RELATIONAL DATABASE MANAGEMENT SYSTEM," filed on Jun. 29, 2000, by George Robert Hood; and Utility application Ser. No. 09/608,682, entitled "RISK PROVISION IMPLEMENTATION FOR FINANCIAL PROCESSING IN A RELATIONAL DATABASE MANAGEMENT SYSTEM," filed on Jun. 29, 2000, by George Robert Hood;

all of which are incorporated by reference herein.

BACKGROUND OF THE INVENTION

1. Field of the Invention

This invention relates in general to financial processing systems performed by computers, and in particular, to the implementation of "amortization" calculations for financial processing using data accessed from a relational database management system.

2. Description of Related Art

Financial processing systems provide tools for financial analysis of accounting data. Typically, each financial processing system operates in a unique way and approaches financial analysis differently. Some financial processing systems are advanced in their approach to profitability calculations, and others are still at a more basic level. In addition, there is no agreement as to the rules for profitability calculations, outside of generally accepted accounting policies that external auditors use.

Yet, the majority of financial processing systems attempt to use profitability calculations to differentiate between sources of revenues and expenses. There is a need, then, for a flexible approach to profitability calculations in terms of the overall metric, as well as the type of data used.

SUMMARY OF THE INVENTION

A Value Analyzer is a data-driven computer-facilitated financial processing system that accesses account, event and organization attributes from a relational database management database, wherein: (1) the account attributes comprise data about accounts being measured, (2) the event attributes comprise data about account-related transactions, and (3) the organization attributes comprise data about the organization's financial status. Profitability calculations are performed in the computer using the account, event and organization attributes accessed from the relational database management system, as well as one or more profit factors and one or more rules. The profitability calculations comprise the following:

$$\text{Profit}(a_1) = \text{Net Interest Revenue }(NIR)(a_1) +$$
$$\text{Other Revenue }(OR)(a_1) - \text{Direct Expense }(DE)(a_1) -$$
$$\text{Indirect Expense }(IE)(a_1) - \text{Risk Provision }(RP)(a_1),$$

for an account $a_i$. The profitability calculations include one or more amortization calculations in the computer using the account, event and organization attributes accessed from the database, and the amortization calculations amortize the Other Revenue, Direct Expense, Indirect Expense, or Risk Provision over a plurality of periods within a term for the account $a_i$. In alternative embodiments, the amortization calculations are selected from a group comprising cash basis, straight-line, declining balance and interest methods.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The Value Analyzer is a data-driven computer-facilitated financial model that provides accurate and consistent profitability calculations using account, event and organization data stored in a relational database management system (RDBMS), wherein: (1) the account attributes comprise data about accounts being measured, (2) the event attributes comprise data about account-related transactions, and (3) the organization attributes comprise data about the organization's financial status. The profitability calculations performed by the Value Analyzer rely on a Five Factor Atomic Profit Metric (FFAPM):

$$\begin{aligned} \text{Profit} = &\text{Net Interest Revenue } (NIR) + \\ &\text{Other Revenue } (OR) - \text{Direct Expense } (DE) - \\ &\text{Indirect Expense } (IE) - \text{Risk Provision } (RP) \\ = &NIR + OR - DE - IE - RP \end{aligned}$$

In the above equation, it is assumed that the sign of elements that reduce profit are negative and those that contribute are positive.

Each of the five factors of FFAPM are defined below:

Net Interest Revenue. This component comprises interest revenue, and is the largest component of profitability (e.g., from loans, deposits, cash, etc.).

Other Revenue. This component comprises non-interest revenue (e.g., fees and commissions), including those driven by events (e.g., open account, excessive counter withdrawals, early payout penalties, etc.).

Direct Expense. This component comprises expenses driven by events that are attributable to accounts.

Indirect Expense. This component comprises expenses that are not attributable to specific accounts. This includes expenses that relate to the cost of doing business that are not driven by account or event activity, such as those that arise from overheads, inefficiencies or differences between standard and actual costs (e.g., the CEO's salary, etc.).

Risk Provision. This component comprises the expected cost of risks that arise from the uncertainties of doing business, e.g., market risks, customer credit, competition, operations, regulatory risks, political risks, etc.

Each of these five factors can be measured for a desired period (daily, weekly, monthly, quarterly, etc.). Moreover, each factor is essentially discrete and independent with fundamentally different characteristics, which strengthens the user's ability to fully utilize the output to determine relationships between account, event and organization data, and enable consistent multiple dimensional aggregation.

The FFAPM is "atomic" in that profitability is computed using data stored in a relational database management system (RDBMS). There are three aspects to this:

components of profitability may be measured below the account level (at events which make up account activity over an accounting period) and accumulated to the account, components of profitability may be measured directly at the account level (such as interest paid or earned for an accounting period), components of profitability may be known, obtained, or aggregated at a higher level, and may be apportioned down to specific accounts and events according to various rules.

The Value Analyzer generally defines "indirect" components of profitability to be those which must be apportioned to accounts and "direct" components to be those which are either computed at the account level, or are tolled up to the account level from lower level events.

Hardware and Software Environment

Figure 1:
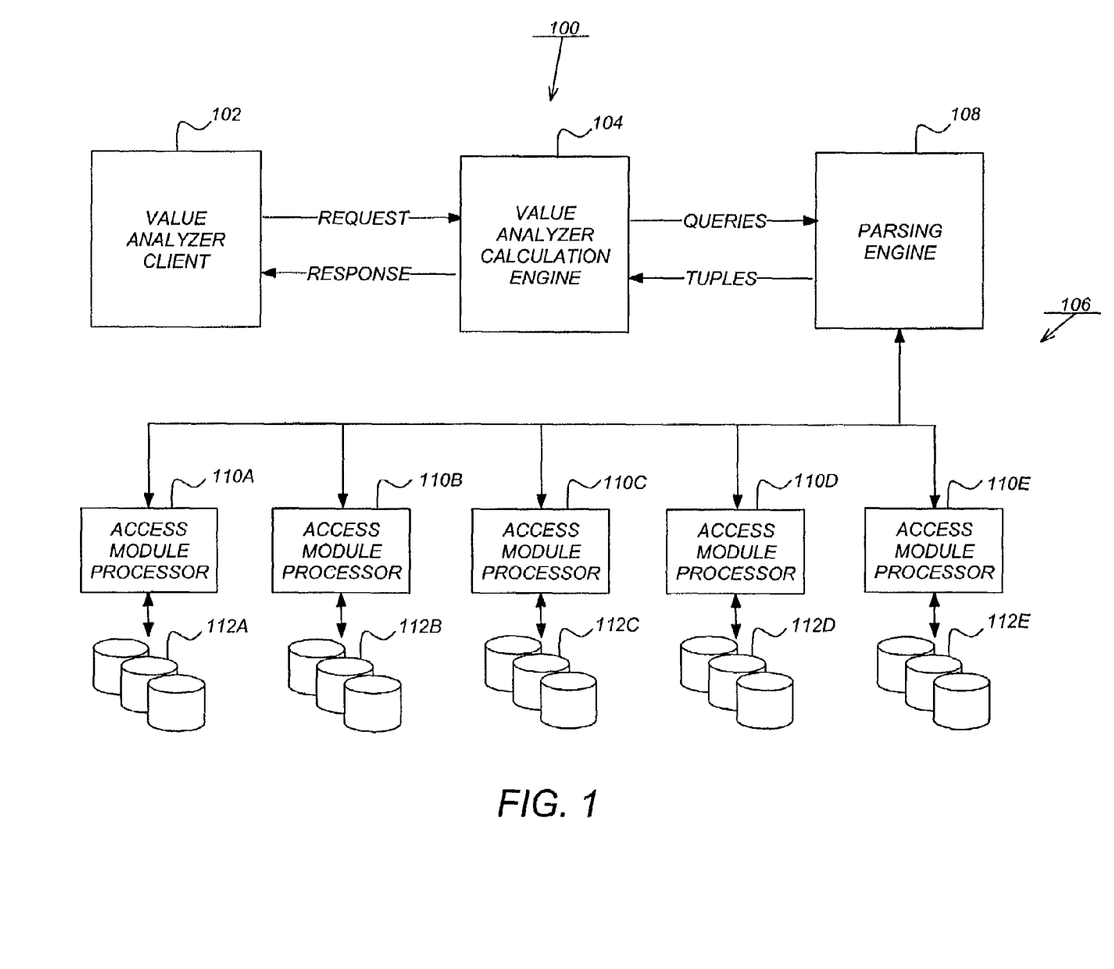
FIG. 1 illustrates an exemplary hardware and software environment according to the preferred embodiment of the present invention.

FIG. 1 illustrates an exemplary hardware and software environment according to the preferred embodiment of the present invention. In the exemplary environment, a computer system 100 implements a financial processing system in a three-tier client-server architecture, wherein the first or client tier provides a Value Analyzer Client 102 that may include, inter alia, a graphical user interface (GUI), the second or middle tier provides a Value Analyzer Calculation Engine 104 for performing profitability calculations as described later in this application, and the third or server tier comprises a Relational DataBase Management System (RDBMS) 106 that stores the data and metadata necessary for performing the profitability calculations from the data and metadata stored in a relational database. The first, second, and third tiers may be implemented in separate machines, or may be implemented as separate or related processes in a single machine.

In the preferred embodiment, the Value Analyzer Client 102 and the Value Analyzer Calculation Engine 104 together are referred to as the Value Analyzer. Generally, the Value Analyzer Client 102 includes a graphical user interface (GUI) for operators of the system 100, wherein requests are transmitted to the Value Analyzer Calculation Engine 104 and responses are received therefrom. The Value Analyzer Calculation Engine 104 performs the profitability calculations and other processing, including commands or functions for performing various search and retrieval functions in the RDBMS 106, wherein queries are transmitted to the RDBMS 106 as requests and tuples are received therefrom as responses. The Value Analyzer Client 102 and the Value Analyzer Calculation Engine 104 may be implemented in separate machines, or may be implemented as separate or related processes in a single machine.

In the preferred embodiment, the RDBMS 106 includes at least one Parsing Engine (PE) 108 and one or more Access Module Processors (AMPs) 11A-110E storing the relational database in one or more data storage devices 112A-112E. The Parsing Engine 108 and Access Module Processors 110 may be implemented in separate machines, or may be implemented as separate or related processes in a single machine. The RDBMS 106 used in the preferred embodiment comprises the Teradata® RDBMS sold by NCR Corporation, the assignee of the present invention, although other DBMS's could be used.

In the preferred embodiment, the system 100 may use any number of different parallelism mechanisms to take advantage of the parallelism offered by multiple Access Module Processors 110. Further, data within the relational database may be fully partitioned across all data storage devices 112 in the system 100 using hash partitioning or other partitioning methods.

Generally, the Value Analyzer Client 102, Value Analyzer Calculation Engine 104, RDBMS 106, Parsing Engine 108, and/or Access Module Processors 110A-110E comprise logic and/or data tangibly embodied in and/or accessible from a device, media, carrier, or signal, such as RAM, ROM, one or more of the data storage devices 112A-112E, and/or a remote system or device communicating with the computer system 100 via one or more data communications devices.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

Value Analyzer Data Flow

Figure 2:
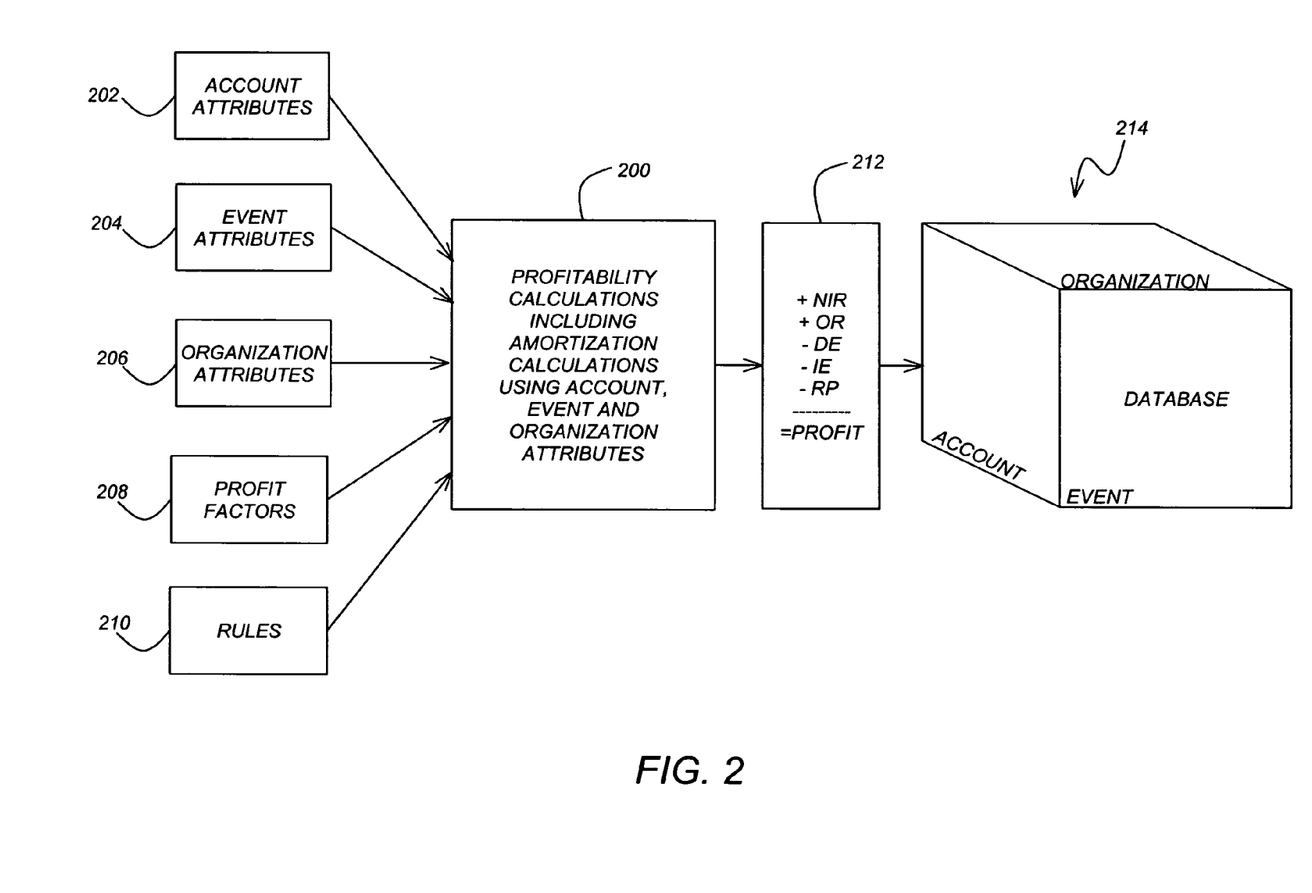
FIG. 2 is a data flow diagram that illustrates the operation of the Value Analyzer according to the preferred embodiment of the present invention.

FIG. 2 is a data flow diagram that illustrates the operation of the Value Analyzer Calculation Engine 104 according to the preferred embodiment of the present invention. Within the Value Analyzer Calculation Engine 104, one or more Profitability Calculations 200 accept a number of inputs including Account Attributes 202, Event Attributes 204, Organization Attributes 206, and Profit Factors 208. Thereafter, the Profitability Calculations 200 invoke one or more Rules 210 that generate the FFAPM 212, which in turn are used to create the Database 214. The Database 214 may be represented along account, event, or organization dimensions, or along other dimensions as may be required. These elements are described in more detail below.

Input Definitions

Account Attributes 202 comprise data about the accounts being measured. This data includes: balance, rate (or interest accrued), product identification, limits, expected default frequency, and various dates (e.g., open, rate reset, last payment, next payment, maturity, etc.).

Event Attributes 204 comprise data about account-related events or transactions. This data includes: account identification, event or transaction amounts, event or transaction location, event or transaction time, counter-party identification, event or transaction type (e.g., loan payment, interest paid, loan draw down amount, etc.).

Organization Attributes 206 comprise data about the financial status of the organization. This data includes: balance sheet and profit statement amounts aggregated by the legal or management entities that own the account base being measured.

Profit Factors 208 include parameter values necessary to perform the Profitability Calculations 200. The major classifications of this data include:

Funds transfer rates are pricing methods that require matched maturity opportunity rates for use in valuing each account's marginal use or source of internal funds.

Unit costs are used for Direct Expense calculations, where a total cost is provided as an Organization Attribute 206 and the Unit Cost is then derived by dividing total cost by actual volume. Unit Costs can be either standard, actual, or market, and ideally represent marginal values (if "fully absorbed measures" are used, then the usefulness of allocated amounts is diminished.)

Allocated amounts are used in both Other Revenue and Indirect Expense calculations, wherein the allocated amounts are apportioned amongst all accounts in a group.

Miscellaneous calculation values may comprise, for example, the number of days in a profit measurement period, an equity allocation weighting, etc. These values are known as "modeling" parameters.

Amortization parameters are used in interest amortization, which requires interest rates and life values used by straight line amortization and by declining balance of amortization.

Risk measurement parameters are used in Risk Provision calculations, which require various factors, such as: loss rates, reserve percentages, exposure factors, recovery rates, default probabilities and collection costs.

Tax rates are required for after-tax profit calculation. The Value Analyzer is designed to calculate pre-tax income on a taxable equivalent basis (where an effective tax rate is all that is required to transform pre-tax income into after tax earnings, i.e., Profit).

Rules

The Profitability Calculations 200 use one or more Rules 210 applied to data retrieved from the RDBMS 106. These Rules 210 include, inter alia, the following:

Treatments. Every account with cash flows affecting a organization's balance sheet requires a method of valuing the account's use of internal funds. One approach is "matched maturity funds transfer pricing," which uses a canonical representation of an account's funding characteristics and then determines a value based on adjusted market yields for each instance that requires an interest rate transfer price to calculate an account's marginal Net Interest Revenue.

Equity Allocation. In order to provide precise Net Interest Revenue calculations, the amount of equity funds required at an account must be determined. This rule allows for equity allocation using any of the following methods: simple ratios; regulatory definitions; economic allocations, or user defined allocations.

Apportionment. Other Revenue, Risk Provision and Indirect Expense calculations are applied at the account level using Organization Attributes 206 that are not related directly to account activity. These profit adjustments are made so that the sum of all account-level Profitability Calculations 200 comprises the overall profit. One approach is to pool indirect costs and revenues and then apportion them. Apportionment rules specify how the pooled indirect costs and revenues is completely allocated to appropriate accounts, wherein the preferred embodiment uses closed form allocation rules, which require only information known in the current period and not iterative computation.

Amortization. Some types of income or expense are deferred or accrued over multiple periods, including and subsequent to the current accounting period. This is common to accrual accounting methods used in profit presentations of financial statements, and gives rise to timing differences between cash flows and their related profit as presented in a financial statement in any accounting period. Since the Value Analyzer is designed to reconcile to the financial statement's profit values, it supports deferral and accrual accounting principles. Amortization methods that account for these timing differences are: interest amortization (used for interest income and expense accruals and for deferral of fees that are in lieu of interest), and straight line or declining balance amortizations (used for cost deferrals and investment depreciation).

Other Revenue Pricing. In situations where account and event activity can be used to derive account level income or fees, the Value Analyzer calculates these drivers of the profitability in the Other Revenue calculations. These calculations comprise linear combinations of event or account values and modeled coefficients.

Direct Expense. The calculation of account profit adjustments due to account-related activity requires rules that take the form of linear combinations of event or account values and modeled coefficients.

Indirect Expense. In situations where expense apportionment or amortization amounts are aggregated, the user may want different rules applied depending on the path (or dimension) of aggregation. These rules allow for multiple profit calculations rules to be applied to derive multiple account level Indirect Expense amounts.

Risk Provision. Adjusting current profit for expected future losses is known as "actuarial" profit provisioning. The Value Analyzer applies actuarial-based methods in its account level profit calculations, where the actuarial reserve that the provisions maintain represents the expected loss associated with all accounts.

Taxable Equivalent Gross-up. Profit is an after-tax measure, and thus some events or portions of some accounts' profits may be excluded from normal taxation. The Value Analyzer adjusts these pre-tax values, so that a singular tax rate can be used to convert pre-tax profit into after-tax values, which are also known as taxable equivalent adjustment. These rules use account and event attributes to adjust each of the five factors of the FFAPM to a taxable equivalent basis.

Interest Yield Adjustments. Since the Value Analyzer can calculate profits for any number of periods, the adjustment of cash interest payments, and the financial statement's accrual or smoothed representation of interest-related Profit, the Value Analyzer provides a method for converting cash interest amounts to accrual amounts for financial statements. The Value Analyzer implements an "effective interest rate" conversion to accomplish this type of calculation.

Profitability Calculations

The following describes the method used by the Profit Calculations 200:

1. Retrieve data from the RDBMS 106.
2. Calculate Net Interest Revenue for every account.
3. Calculate Other Revenue for every account.
4. Calculate Direct Expense for every account.
5. Calculate Indirect Expense for every account.
6. Calculate Risk Provision for every account.
7. Calculate Profit for every account.
8. Store the FFAPM Profit and the five factors of FFAPM into the RDBMS 106.
9. Aggregate and/or re-calculate the FFAPM Profit and the five factors of FFAPM as necessary.

Note that steps 2 through 6 perform account-level calculations. Steps 2, 3, 4, 5, and 6 can be performed independently and in parallel, while step 7 requires values derived in steps 2, 3, 4, 5, and 6, and therefore must be performed after steps 2, 3, 4, 5, and 6 are completed.

Output Definition

The Profit Calculations 200 generate one or more values for the five factors of the FFAPM 210, and specifically, the NIR, OR, DE, IE, RP, and Profit values. These values are used to generate the output data 214, which can be stored by the RDBMS 106 in the relational database.

Analytic Variations

The Value Analyzer operates on data and calculations across a continuum, in order to provide the analytic variations necessary for financial processing at various levels of aggregation. This continuum is comprised of multiple tiers as described below:

basic→intermediate→advanced→breakthrough.

Not every tier is necessarily present for each element of data or every calculation.

This continuum embodies the notion of inheritance, wherein the data and calculations of the higher tiers embody the data and calculations of the lower tiers. The principle of inheritance means that the data and calculations by which the separate tiers are defined are nested, i.e., the definition of "intermediate" includes the definition of "basic," but with added functionality that goes beyond "basic," and so on. Thus, there is consistency in the data and calculations performed at the different tiers in the continuum.

Amortization

Often, the Other Revenue, Direct Expense, Indirect Expense, or Risk Provision components of profitability to be assigned to an account must be amortized over a period of time. This reflects an accrual accounting method, rather than a cash flow accounting method. This allows cash flows that occur within a specific processing period to be recognized over time, thereby creating a more consistent picture of profitability over the life of an account. The amount of cash recognized in a future period is known as that period's "amortization."

In one embodiment, the present invention supports three different methods of amortization: straight-line, declining balance (e.g., single, double, or X declining), and interest methods. The choice of method is made at the level where accounts are linked to the amount to be amortized. The amortization life may be account specific, and when account data on estimated remaining life are available, default life values will be set at the time that the account-amount linkage occurs.

The following amortization properties are supported:

Accounts for any period are linked to a value (and apportionment rule if appropriate), an amortization method, and a default life.

Amortization of the value will occur at the account level based on the amortization method set in the step above.

If any such account closes prior to the time estimated when the link was established in the first step, then the remaining account-level unamortized amount will be a current period profit adjustment.

For any amortization method, there is a set of parameters required, including the following:

the amount to be amortized, the Interest Rate used in amortization, and the term over which amortization will occur.

Amortization of amounts over a period of time is really a two-step process. The first step is to determine the amount to be amortized for the entire period. The second step is to determine the amount to be amortized in the current processing period, and to store the relevant data to calculate the amounts to be amortized in subsequent processing periods. Subsequent processing periods access this data and calculate the appropriate amount to be recognized, or amortized for that processing period.

An additional requirement is to start amortization of an amount after the amortization period has begun. In these cases, the system needs to have an additional process, that is, adjust the processing of current periods so that they represent the point in the amortization term from when the amortization of the amount should have started. This will allow the system to amortize amounts for accounts which were originated prior to the current processing period.

Amortization Formulas

As noted above, there are three amortization methods that may be selected. For convenience, a non-deferral (cash basis) method is included as an amortization method, by setting the amortization life to one cycle. In summary, then, the system performs amortization by one of four methods:

1) cash basis,
2) straight line amortization,
3) double declining balance amortization, and
4) interest method of amortization.

The amortization requires identifying the amortization life, as well as the method. In many cases, this is the life of the account (such as the term of a loan), but it may be a fixed term depending on business rules and the nature of the deferral amount. As a default, the system assumes the amortization life to be the remaining life of the account, if it is fixed (which it is not for demand accounts, for example). This amount must be amortized over the remaining life of all accounts having this event type in this period. Further, the Financial Institution may choose to override this default life; an assumed life to amortize over is determined at the period of the initial event. If the account is closed prematurely, then the remaining unamortized amount is allocated at the time of closure. The calculations require maintaining the amortization information (point in the life, amount remaining, and data needed to determine the amount for the current period) through the life of the amortization for each amortizing amount accruing to the account.

The formulas for the amortization methods are given below.

$Amt$ = the initial or original amount to be amortized, $Life(Amt)$ = the number of amortization terms, $k$ = the number of terms elapsed since amortization began, $AM_k(Amt)$ = the amortization amount for term $k$, $\overline{AM_k}(Amt)$ = the remaining amount to amortize at term $k$, $= Amt$ if $k = 0$ $= \overline{AM}_{k-1}(Amt) - AM_k(Amt)$ if life $\geq k \geq 1$ $= 0$ if $k >$ life For a Straight Line method, the following is defined:

$$AM_k(Amt) = \frac{Amt}{Life} \text{ if life } \geq k \geq 1$$

For a Double Declining Balance method, the amount to be amortized in period t is:

$$AM_k(Amt) = \left[\frac{2Amt}{n-t+1}\right]\left(1 - 2\frac{(t-1)\left(n-\frac{t}{2}\right)}{(n)(n-1)}\right)$$

for t=1, ..., n, wherein n is the number of amortization periods and t is the current amortization period.

For an Interest method, the following is defined:

$$AM_k(Amt) = \frac{Amt * i * (1+i)^{k-1}}{(1+i)^{Life} - 1}$$

where i is a rate given by the user (i.e., Financial Institution) for the amortization calculation, such as a debt rate or a weighted cost of capital.

For all methods, the following is defined:

$$AM_k(Amt) = 0 \text{ if } k > \text{life}$$

$$\text{Also, note that: } \sum_k AM_k(Amt) = Amt.$$

Calculation of Amortized and Unamortized Amounts

For processing and methodology purposes, it is often necessary to have amortized amount and the unamortized amount at any given point k in the amortization period. This is represented by:

Amount to be Amortized=Unamortized Amount$_k$+ Amortized Amount$_k$ where k=1, ..., n and n is the amortization term.

Also, since adjustments to the amount amortized in the first period may be made based on the amortization start date, the adjustment needs to be incorporated into the unamortized amount and amortized amount formulas. This means there are two parts to each of the amortized and unamortized amounts for each period, the standard calculation plus an adjustment for start date effect.

To make the calculation process easier, two start date adjustments values will be calculated and stored first, then they can be used for any value of i. These values are:

$Amt_1$=Amount which should be amortized in the first period.

Adj. $Amt_1$=Actual amount amortized in first period, which has been adjusted by effect the start date.

The amount amortized in the first period is dependent upon the amortization method chosen as described above. Note that a start date adjustment may be made only when the account was originated during the current or prior processing periods. Start date adjustments will not be made to accounts which were opened prior to the start of processing, since those adjustments are not material from a business perspective, and the system would need to calculate the number of days in historical processing periods. This means that the two amounts defined above will have the same value if no start date adjustment was made.

Since the amount to be amortized in any period is determined by the amortization type, the unamortized amount and the amortized amount are also dependent on the amortization type. The formulas used to calculate the unamortized amount and amortized amount for each amortization type are discussed below.

Straight Line Amortization

Set forth below are the formulas used in calculating the Unamortized Amount and the Amortized Amount for any given value of i:

If $k < n$, then:

Amortized Amount = $Adj. Amt_1 + (k-1) * (Amt/n)$

Unamortized amount = $(n-k) * (Amt/n) + (Amt_1 - Adj.Amt_1)$

If $k = n$, then:

Amortized Amount = $Amt$

Unamortized amount = 0 where $k = 1, \ldots, n$ and $n$ is the number of terms in the amortization period Double Declining Balance The amortized amount and the unamortized amount for any period can be calculated using the following parameters:
n=amortization terms,
k=point in amortization period, where k=1, ..., n,
Amt=amount to be amortized,
$Amt_k$=amount amortized in period k, and
$Amt_1$=amount amortized in the first amortization period.

The general formulas for the amortized amount and unamortized amount through period k are defined as follows:

Amortized Amount = $k * (Amt_1 + Amt_k)/2$

Unamortized amount = $Amt - [k * (Amt_1 + Amt_k)/2]$

The above general formulas need to be adjusted for any start date adjustments resulting in the following formulas:

Amortized Amount = $k*(Amt_1 + Amt_k)/2 - (Amt_1 - Adj.Amt_1)$

Unamortized Amount = $Amt - [k*(Amt_1 + Amt_k)2] + (Amt_1 - Adj.Amt_1)$

Interest Method

Amortized amounts and unamortized amounts using the interest method can also be calculated for any given point in the amortization term. The following variables are used in the derivation of the amortized and unamortized amounts:
n=amortization period,
k=point in the amortization period, k=1, ..., n,
$r_a$=annual interest rate,
p=periodicity of update (12=monthly, 4=quarterly, etc.),
r=period rate or $r_a/p$,
Amt=amount to be amortized, and
$Amt_k$=amount amortized in period k.

The following defines the amount to be amortized in any given period k:

$$Amt_k = \frac{Amt * r * (1+r)^{(k-1)}}{(1+r)^n - 1} \quad (1)$$

This means that the amount amortized through period k is:

$$\sum Amt_k = \sum \frac{Amt * r * (1+r)^{(k-1)}}{(1+r)^n - 1} \quad (2)$$

where $i = 1, \ldots, k$.

From equation (2), the constants can be factored out to arrive at the amortized amount through period k:

$$\sum Amt_k = \frac{Amt * r * \sum (1+r)^{(k-1)}}{(1+r)^0 - 1} \quad (3)$$

If looking only at the summation portion of equation (3):

$$\sum (1+r)^{(i-1)} \quad (4)$$

Equation (4) is a geometric progression of the form:

$$S_t = \sum m^h \quad (5)$$

wherein $h=1, \ldots, t$. Equation (5) can be rewritten as:

$$S_t = \frac{1 - m^{(t+1)}}{(1-m)} \quad (6)$$

Substituting the amortization summation expression (4) into equation (6), the following is defined:

$$\sum (1+r)^{(i-1)} = \frac{1 - (1+r)^{((k-1)+1)}}{1(1+r)} \quad \text{or:} \quad (7)$$

$$\sum (1+r)^{(i-1)} = \frac{1 - (1+r)^k}{-r} = \frac{(1+r)^k - 1}{r}$$

Replacing the summation expression in equation (3) with the left hand side of equation (7), then amount amortized through period k is defined as:

$$\frac{Amt * r \sum (1+r)^{(i-1)}}{(1+r)^n - 1} \quad \text{or:} \quad (3)$$

$$\frac{Amt * r}{(1+r)^n - 1} * \frac{(1+r)^k - 1}{r} \quad (8)$$

The above formula gives the amount amortized through period k as a function of fixed values for each amortization rule. This means there is now a fixed, general formula to calculate the amortized amount. This means the unamortized amount will be:

$$Amt - \left[\frac{Amt * r}{(1+r)^n - 1} * \frac{(1+r)^k - 1}{r}\right] + (Amt_1 - Adj.Amt_1) \quad (9)$$

Now, there that are two general formulas for calculating the amortized and unamortized amount through any period k, and these can be adjusted for the effect of the amortization start date.

Adjusting equation (8) and equation (9) for the effect of start date adjustment results in the following two equations for the amortized and unamortized amounts. For the amortized amount through period k:

$$\left[\frac{Amt*r}{(1+r)^n - 1} * \frac{(1+r)^k - 1}{r}\right] + (Amt_1 - Adj.Amt_1) \qquad (10)$$

For the unamortized amount through period k:

$$Amt - \left[\frac{Amt*r}{(1+r)^n - 1} * \frac{(1+r)^k - 1}{r}\right] + (Amt_1 - Adj.Amt_1) \qquad (11)$$

Logic of the Preferred Embodiment

Figure 3:
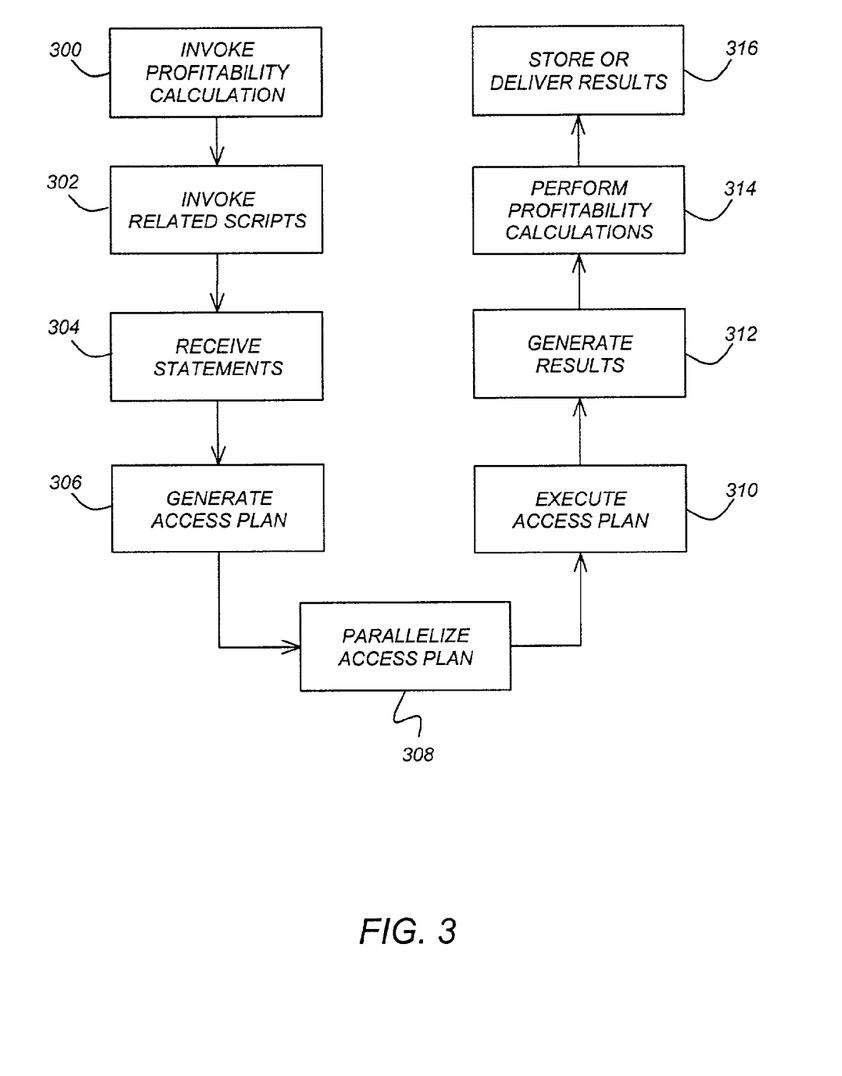
FIG. 3 is a flow chart illustrating the steps necessary for the execution of Profitability Calculations according to the preferred embodiment of the present invention.

FIG. 3 is a flow chart illustrating the steps necessary for the execution of Profitability Calculations 200 according to the preferred embodiment of the present invention. Those skilled in the art will recognize that this logic is provided for illustrative purposes only and that different logic may be used to accomplish the same results.

Block 300 represents the Value Analyzer Client 102 invoking one or more

Profitability Calculations 200 in the Value Analyzer Calculation Engine 104.

Block 302 represents the Value Analyzer Calculation Engine 104 invoking one or more scripts related to the invoked Profitability Calculations 200, wherein the scripts comprise SQL statements that are transmitted to the RDBMS 106. These SQL statements access account, event and organization attributes from the database managed by the RDBMS 106.

Block 304 represents the Parsing Engine 108 of the RDBMS 106 receiving the SQL statements and transforming the statements into an operator tree.

Block 306 represents the Parsing Engine 108 of the RDBMS 106 generating one or more access plans from the operator tree.

Block 308 represents the Parsing Engine 108 of the RDBMS 106 parallelizing the access plans, and then transmitting the access plans to their assigned Access Module Processors 110A-E of the RDBMS 106.

Block 310 represents the Access Module Processors 110A-E of the RDBMS 106 performing the required data manipulation associated with the access plans received from the Parsing Engine 108, wherein the access plans are performed in parallel by the Access Module Processors 110A-E.

Block 312 represents the Parsing Engine 108 of the RDBMS 106 merging the results received from the Access Module Processors 110A-E and providing the merged results to the Value Analyzer Calculation Engine 104 as account, event and organization attributes.

Block 314 represents the Value Analyzer Calculation Engine 104 performing the invoked Profitability Calculations 200 using the account, event and organization attributes accessed from the RDBMS 106, as well as one or more profit factors and one or more rules. In this Block, the Profitability Calculations 200 comprise:

Profit $(a_1)$ = Net Interest Revenue $(NIR)(a_1)$ +
 Other Revenue $(OR)(a_1)$ − Direct Expense $(DE)(a_1)$ −
 Indirect Expense $(IE)(a_1)$ − Risk Provision $(RP)(a_1)$, For an account $a_i$.

In Block 314, invoked Profitability Calculations 200 also perform one or more amortization calculations in the computer using the account, event and organization attributes accessed from the RDBMS 106, wherein the amortization calculations amortize the Other Revenue, Direct Expense, Indirect Expense, or Risk Provision over a plurality of periods within a term for the account $a_i$. These amortization calculations are selected from a group comprising cash basis, straight-line, declining balance and interest methods.

In one embodiment, Block 314 performs straight-line amortization, wherein the straight-line method comprises calculating an Unamortized Amount and an Amortized Amount, such that:

if $k < n$, then:
Amortized Amount = $Adj.Amt_1 + (k - 1) * (Amt/n)$
Unamortized amount = $(n - k) * (Amt/n) + (Amt_1 - Adj.Amt_1)$ if $k = n$, then:
Amortized Amount = $Amt$
Unamortized amount = 0 wherein:

$n$ = number of terms in amortization period, $k$ = number of terms elapsed since amortization began, such that $k = 1, ..., n$, $Amt$ = an initial amount to be amortized, $Adj.\ Amt_1$ = actual amount amortized in first period, $Life(Amt)$ = number of amortization terms, $AM_k(Amt)$ = amortization amount for term $k$, such that:
 = $Amt$   if $k - 0$
 = $\frac{Amt}{Life}$   if $life \geq k \geq 1$
 = 0   if $k > life$.

In another embodiment, Block 314 performs declining balance amortization, wherein the declining balance method comprises calculating an Unamortized Amount and an Amortized Amount, such that:

Amortized Amount = $k * (Amt_1 + Amt_k)/2$
Unamortized Amount = $Amt - [k * (Amt_1 + Amt_k)/2]$ wherein:
n=number of terms in amortization period,
k=number of terms elapsed since amortization began, such that k=1, . . . , n,
$Amt_1$=amount amortized in a first amortization period, and
$Amt_k$=amount amortized in period k.

In yet another embodiment, Block 314 performs declining balance amortization, wherein the declining balance method comprises calculating an Unamortized Amount and an Amortized Amount, such that:

$$\text{Amortized Amount} = k * (Amt_1 + Amt_k)/2 - (Amt_1 - Adj.Amt_1)$$
$$\text{Unamortized Amount} = Amt - [k * (Amt_1 + Amt_k)/2] + (Amt_1 - Adj.Amt)$$

wherein:
n=number of terms in amortization period,
k=number of terms elapsed since amortization began, such that k=1, . . . , n,
$Amt_1$=amount amortized in a first amortization period, and
$Amt_k$=amount amortized in period k, and
$Adj.Amt_1$=actual amount amortized in a first period.

In still another embodiment, Block 314 performs interest amortization, wherein the interest method comprises calculating an Unamortized Amount and an Amortized Amount, such that:

$$\text{Amortized Amount} = \left[\frac{Amt*r}{(1+r)^n - 1} * \frac{(1+r)^k - 1}{r}\right] + (Amt_1 - Adj.Amt_1)$$

$$\text{Unamortized Amount} = Amt - \left[\frac{Amt*r}{(1+r)^n - 1} * \frac{(1+r)^k - 1}{r}\right] + (Amt_1 - Adj.Amt_1)$$

wherein:
n=number of terms in amortization period,
k=number of terms elapsed since amortization began, such that k=1, . . . , n,
$r_a$=annual interest rate,
p=periodicity of update,
r=period rate or $r_a/p$,
Amt=amount to be amortized,
$Amt_1$=amount amortized in a first amortization period, and
$Adj.Amt_1$=actual amount amortized in a first period.

Any one of these different amortization methods can be selected by the user, as desired.

Block 316 represents the Value Analyzer Calculation Engine 104 delivering the output or results from the invoked Profitability Calculations 200 to the Value Analyzer Client 102 and/or the RDBMS 106. With regard to the Value Analyzer Client 102, the results may be presented to the user, printed, or used by various other computer programs, as desired. With regard to the RDBMS 106, the results may be stored for later use by the Value Analyzer Calculation Engine 104, or other computer programs, as desired.

CONCLUSION

This concludes the description of the preferred embodiment of the invention. The following paragraphs describe some alternative embodiments for accomplishing the same invention.

In one alternative embodiment, any type of computer or configuration of computers could be used to implement the present invention. In addition, any database management system, decision support system, on-line analytic processing system, or other computer program that performs similar functions could be used with the present invention.

In summary, the present invention discloses a Value Analyzer, which is a data-driven computer-facilitated financial processing system that accesses account, event and organization attributes from a relational database management database, wherein: (1) the account attributes comprise data about accounts being measured, (2) the event attributes comprise data about account-related transactions, and (3) the organization attributes comprise data about the organization's financial status. Profitability calculations are performed in the computer using the account, event and organization attributes accessed from the relational database management system, as well as one or more profit factors and one or more rules. The profitability calculations comprise the following:

$$\text{Profit } (a_1) = \text{Net Interest Revenue } (NIR)(a_1) +$$
$$\text{Other Revenue } (OR)(a_1) - \text{Direct Expense } (DE)(a_1) -$$
$$\text{Indirect Expense } (IE)(a_1) - \text{Risk Provision } (RP)(a_1),$$

for an account $a_i$, wherein the profitability calculations include one or more amortization calculations in the computer using the account, event and organization attributes accessed from the database, and the amortization calculations amortize the Other Revenue, Direct Expense, Indirect Expense, or Risk Provision over a plurality of periods within a term for the account $a_i$. In alternative embodiments, the amortization calculations are selected from a group comprising cash basis, straight-line, declining balance and interest methods.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:
1. A method of performing financial processing in a computer, comprising:
(a) accessing account, event and organization attributes from a database accessible by the computer, wherein: (1) the account attributes comprise data about accounts being measured, (2) the event attributes comprise data about account-related transactions, and (3) the organization attributes comprise data about the organization's financial status; and
(b) performing one or more profitability calculations in the computer using the account, event and organization attributes accessed from the database, results from the amortization calculations, as well as one or more profit factors and one or more rules, wherein the profitability calculations comprise:

$$\text{Profit}(a_i) = \text{Net Interest Revenue }(NIR)(a_i) +$$
$$\text{Other Revenue }(OR)(a_i) - \text{Direct Expense }(DE)(a_i) -$$
$$\text{Indirect Expense }(IE)(a_i) - \text{Risk Provision }(RP)(a_i),$$

for an account $a_i$, wherein the profitability calculations include one or more amortization calculations in the computer using the account, event and organization attributes accessed from the database, the amortization calculations comprise a straight-line method that amortizes the Other Revenue, Direct Expense, Indirect Expense, or Risk Provision over a plurality of periods within a term for the account $a_i$, and the straight-line method comprises calculating an Unamortized Amount and an Amortized Amount, such that:

if k<n, then:

$$\text{Amortized Amount} = Adj.Amt_1 + (k-1)*(Amt/n)$$
$$\text{Unamortized amount} = (n-k)*(Amt/n) + (Amt_1 - Adj.Amt_1)$$

if k=n, then:

$$\text{Amortized Amount} = Amt$$
$$\text{Unamortized amount} = 0$$

wherein:

$n$ = number of terms in amortization period, $k$ = number of terms elapsed since amortization began, such that $k = 1, ..., n$, $Amt$ = an inital amount to be amortized, $Adj.\ Amt_1$ = actual amount amortized in first period, $Life(Amt)$ = number of amortization terms, $AM_k(Amt)$ = amortization amount for term $k$, such that:

$= Amt$ if $k - 0$ $= \dfrac{Amt}{Life}$ if life $\geq k \geq 1$ $= 0$ if $k >$ life.

2. A method of performing financial processing in a computer, comprising:
(a) accessing account, event and organization attributes from a database accessible by the computer, wherein: (1) the account attributes comprise data about accounts being measured, (2) the event attributes comprise data about account-related transactions, and (3) the organization attributes comprise data about the organization's financial status; and
(b) performing one or more profitability calculations in the computer using the account, event and organization attributes accessed from the database, results from the amortization calculations, as well as one or more profit factors and one or more rules, wherein the profitability calculations comprise:

$$\text{Profit}(a_j) = \text{Net Interest Revenue }(NIR)(a_j) +$$
$$\text{Other Revenue }(OR)(a_j) - \text{Direct Expense }(DE)(a_j) -$$
$$\text{Indirect Expense }(IE)(a_j) - \text{Risk Provision }(RP)(a_j),$$

for an account $a_i$, wherein the profitability calculations include one or more amortization calculations in the computer using the account, event and organization attributes accessed from the database, the amortization calculations comprise a declining balance method that amortizes the Other Revenue, Direct Expense, Indirect Expense, or Risk Provision over a plurality of periods within a term for the account $a_i$, and the declining balance method comprises calculating an Unamortized Amount and an Amortized Amount, such that:

$$\text{Amortized Amount} = k*(Amt_1 + Amt_k)/2$$
$$\text{Unamortized Amount} = Amt - [k*(Amt_1 + Amt_k)/2]$$

wherein:
n=number of terms in amortization period,
k=number of terms elapsed since amortization began, such that k=1, ..., n,
$Amt_1$=amount amortized in a first amortization period, and
$Amt_k$=amount amortized in period k.

3. A method of performing financial processing in a computer, comprising:
(a) accessing account, event and organization attributes from a database accessible by the computer, wherein: (1) the account attributes comprise data about accounts being measured, (2) the event attributes comprise data about account-related transactions, and (3) the organization attributes comprise data about the organization's financial status; and
(b) performing one or more profitability calculations in the computer using the account, event and organization attributes accessed from the database, results from the amortization calculations, as well as one or more profit factors and one or more rules, wherein the profitability calculations comprise:

$$\text{Profit}(a_i) = \text{Net Interest Revenue }(NIR)(a_i) +$$
$$\text{Other Revenue }(OR)(a_i) - \text{Direct Expense }(DE)(a_i) -$$
$$\text{Indirect Expense }(IE)(a_i) - \text{Risk Provision }(RP)(a_i),$$

for an account $a_i$, wherein the profitability calculations include one or more amortization calculations in the computer using the account, event and organization attributes accessed from the database, the amortization calculations comprise a straight-line method that amortizes the Other Revenue, Direct Expense, Indirect Expense, or Risk Provision over a plurality of periods within a term for the account $a_i$, and the declining balance method comprises calculating an Unamortized Amount and an Amortized Amount, such that:

$$\text{Amortized Amount} = k*(Amt_1 + Amt_k)/2 - (Amt_1 - Adj.Amt_1)$$
$$\text{Unamortized Amount} = Amt - [k*(Amt_1 + Amt_k)/2] + (Amt_1 - Adj.Amt)$$

wherein:
n=number of terms in amortization period,
k=number of terms elapsed since amortization began, such that k=1, ..., n,
$Amt_1$=amount amortized in a first amortization period, and
$Amt_k$=amount amortized in period k, and
$Adj.Amt_1$=actual amount amortized in a first period.

4. A method of performing financial processing in a computer, comprising:
(a) accessing account, event and organization attributes from a database accessible by the computer, wherein: (1) the account attributes comprise data about accounts being measured, (2) the event attributes comprise data about account-related transactions, and (3) the organization attributes comprise data about the organization's financial status; and
(b) performing one or more profitability calculations in the computer using the account, event and organization attributes accessed from the database, results from the amortization calculations, as well as one or more profit factors and one or more rules, wherein the profitability calculations comprise:

$$\text{Profit }(a_i) = \text{Net Interest Revenue }(NIR)(a_i) +$$
$$\text{Other Revenue }(OR)(a_i) - \text{Direct Expense }(DE)(a_i) -$$
$$\text{Indirect Expense }(IE)(a_i) - \text{Risk Provision }(RP)(a_i),$$

for an account $a_i$, wherein the profitability calculations include one or more amortization calculations in the computer using the account, event and organization attributes accessed from the database, the amortization calculations comprise an interest method that amortizes the Other Revenue, Direct Expense, Indirect Expense, or Risk Provision over a plurality of periods within a term for the account $a_i$, and the interest method comprises calculating an Unamortized Amount and an Amortized Amount, such that:

$$\text{Amortized Amount} = \left[\frac{Amt*r}{(1+r)^n - 1} * \frac{(1+r)^k - 1}{r}\right] + (Amt_1 - Adj.Amt_1)$$
$$\text{Unamortized Amount} = Amt - \left[\frac{Amt*r}{(1+r)^n - 1} * \frac{(1+r)^k - 1}{r}\right] + (Amt_1 - Adj.Amt_1)$$

wherein:
n=number of terms in amortization period,
k=number of terms elapsed since amortization began, such that k=1, ..., n,
$r_a$=annual interest rate,
p=periodicity of update,
r=period rate or $r_a/p$,
Amt=amount to be amortized,
$Amt_1$=amount amortized in a first amortization period, and
$Adj.Amt_1$=actual amount amortized in a first period.

5. A system for financial processing, comprising:
a computer;
logic, performed by the computer, for:
(a) accessing account, event and organization attributes from a database accessible by the computer, wherein: (1) the account attributes comprise data about accounts being measured, (2) the event attributes comprise data about account-related transactions, and (3) the organization attributes comprise data about the organization's financial status; and
(b) performing one or more profitability calculations in the computer using the account, event and organization attributes accessed from the database, results from the amortization calculations, as well as one or more profit factors and one or more rules, wherein the profitability calculations comprise:

$$\text{Profit }(a_i) = \text{Net Interest Revenue }(NIR)(a_i) +$$
$$\text{Other Revenue }(OR)(a_i) - \text{Direct Expense }(DE)(a_i) -$$
$$\text{Indirect Expense }(IE)(a_i) - \text{Risk Provision }(RP)(a_i),$$

for an account $a_i$, wherein the profitability calculations include one or more amortization calculations in the computer using the account, event and organization attributes accessed from the database, the amortization calculations include a straight-line method that amortizes the Other Revenue, Direct Expense, Indirect Expense, or Risk Provision over a plurality of periods within a term for the account $a_i$, and the straight-line method comprises logic for calculating an Unamortized Amount and an Amortized Amount, such that:
if k<n, then:

$$\text{Amortized Amount} = Adj.Amt_1 + (k-1)*(Amt/n)$$
$$\text{Unamortized amount} = (n-k)*(Amt/n) + (Amt_1 - Adj.Amt_1)$$

if k=n, then:

$$\text{Amortized Amount} = Amt$$
$$\text{Unamortized amount} = 0$$

wherein:

$n$ = number of terms in amortization period, $k$ = number of terms elapsed since amortization began, such that $k = 1, ..., n$, $Amt$ = an inital amount to be amortized, $Adj.\ Amt_1$ = actual amount amortized in first period, $Life(Amt)$ = number of amortization terms, $AM_k(Amt)$ = amortization amount for term $k$, such that:
$= Amt$ if $k = 0$
$= \frac{Amt}{Life}$ if life $\geq k \geq 1$
$= 0$ if $k >$ life.

6. A system for financial processing, comprising:

a computer;

logic, performed by the computer, for:

(a) accessing account, event and organization attributes from a database accessible by the computer, wherein: (1) the account attributes comprise data about accounts being measured, (2) the event attributes comprise data about account-related transactions, and (3) the organization attributes comprise data about the organization's financial status; and (b) performing one or more profitability calculations in the computer using the account, event and organization attributes accessed from the database, results from the amortization calculations, as well as one or more profit factors and one or more rules, wherein the profitability calculations comprise:

$$\text{Profit}(a_i) = \text{Net Interest Revenue}(NIR)(a_i) +$$
$$\text{Other Revenue}(OR)(a_i) - \text{Direct Expense}(DE)(a_i) -$$
$$\text{Indirect Expense}(IE)(a_i) - \text{Risk Provision}(RP)(a_i),$$

for an account $a_i$, wherein the profitability calculations include one or more amortization calculations in the computer using the account, event and organization attributes accessed from the database, the amortization calculations include a declining balance method that amortizes the Other Revenue, Direct Expense, Indirect Expense, or Risk Provision over a plurality of periods within a term for the account $a_i$, and the declining balance method comprises logic for calculating an Unamortized Amount and an Amortized Amount, such that:

$$\text{Amortized Amount} = k*(Amt_1 + Amt_k)/2$$
$$\text{Unamortized Amount} = Amt - [k*(Amt_1 + Amt_k)/2]$$

wherein:

n=number of terms in amortization period, k=number of terms elapsed since amortization began, such that k=1, . . . , n, $Amt_1$=amount amortized in a first amortization period, and $Amt_k$=amount amortized in period k.

7. A system for financial processing, comprising:

a computer:

logic, performed by the computer, for:

(a) accessing account, event and organization attributes from a database accessible by the computer, wherein: (1) the account attributes comprise data about accounts being measured, (2) the event attributes comprise data about account-related transactions, and (3) the organization attributes comprise data about the organization's financial status; and (b) performing one or more profitability calculations in the computer using the account, event and organization attributes accessed from the database, results from the amortization calculations, as well as one or more profit factors and one or more rules, wherein the profitability calculations comprise:

$$\text{Profit}(a_i) = \text{Net Interest Revenue}(NIR)(a_i) +$$
$$\text{Other Revenue}(OR)(a_i) - \text{Direct Expense}(DE)(a_i) -$$
$$\text{Indirect Expense}(IE)(a_i) - \text{Risk Provision}(RP)(a_i),$$

for an account $a_i$, wherein the profitability calculations include one or more amortization calculations in the computer using the account, event and organization attributes accessed from the database, the amortization calculations include a declining balance method that amortizes the Other Revenue, Direct Expense, Indirect Expense, or Risk Provision over a plurality of periods within a term for the account $a_i$, and the declining balance method comprises logic for calculating an Unamortized Amount and an Amortized Amount, such that:

$$\text{Amortized Amount} = k*(Amt_1 + Amt_k)/2 - (Amt_1 - Adj.Amt_1)$$
$$\text{Unamortized Amount} = Amt - [k*(Amt_1 + Amt_k)/2] + (Amt_1 - Adj.Amt)$$

wherein:

n=number of terms in amortization period, k=number of terms elapsed since amortization began, such that k=1, . . . , n, $Amt_1$=amount amortized in a first amortization period, and $Amt_k$=amount amortized in period k, and $Adj.Amt_1$=actual amount amortized in a first period.

8. A system for financial processing, comprising:

a computer:

logic, performed by the computer, for:

(a) accessing account, event and organization attributes from a database accessible by the computer, wherein: (1) the account attributes comprise data about accounts being measured, (2) the event attributes comprise data about account-related transactions, and (3) the organization attributes comprise data about the organization's financial status; and (b) performing one or more profitability calculations in the computer using the account, event and organization attributes accessed from the database, results from the amortization calculations, as well as one or more profit factors and one or more rules, wherein the profitability calculations comprise:

$$\text{Profit}(a_i) = \text{Net Interest Revenue}(NIR)(a_i) +$$
$$\text{Other Revenue}(OR)(a_i) - \text{Direct Expense}(DE)(a_i) -$$
$$\text{Indirect Expense}(IE)(a_i) - \text{Risk Provision}(RP)(a_i),$$

for an account $a_i$, wherein the profitability calculations include one or more amortization calculations in the computer using the account, event and organization attributes accessed from the database, the amortization calculations include an interest method that amortizes the Other Revenue, Direct Expense, Indirect Expense, or Risk Provision over a plurality of periods within a term for the account $a_i$, and the interest method comprises logic for calculating an Unamortized Amount and an Amortized Amount, such that:

$$\text{Amortized Amount} = \left[\frac{Amt*r}{(1+r)^n - 1} * \frac{(1+r)^k - 1}{r}\right] + (Amt_1 - Adj.Amt_1)$$

$$\text{Unamortized Amount} = Amt - \left[\frac{Amt*r}{(1+r)^n - 1} * \frac{(1+r)^k - 1}{r}\right] + (Amt_1 - Adj.Amt_1)$$

wherein:
n=number of terms in amortization period,
k=number of terms elapsed since amortization began, such that k=1, . . . , n,
$r_a$=annual interest rate,
p=periodicity of update,
r=period rate or $r_a$/p,
Amt=amount to be amortized,
$Amt_1$=amount amortized in a first amortization period, and
$Adj.Amt_1$=actual amount amortized in a first period.

* * * * *